(12) United States Patent
Curran et al.

(10) Patent No.: US 10,782,741 B2
(45) Date of Patent: Sep. 22, 2020

(54) ABRASION-RESISTANT SURFACE FINISHES ON METAL ENCLOSURES (71) Applicant: Apple Inc., Cupertino, CA (US)

(72) Inventors: James A. Curran, Morgan Hill, CA (US); Zechariah D. Feinberg, San Francisco, CA (US); Brian S. Tryon, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/454,880

(22) Filed: Mar. 9, 2017

(65) Prior Publication Data
US 2018/0263130 A1 Sep. 13, 2018

(51) Int. Cl.
*G06F 1/16* (2006.01)

(52) U.S. Cl.
CPC .................. *G06F 1/1656* (2013.01)

(58) Field of Classification Search
CPC ...... H05K 5/04; H05K 5/0086; G06F 1/1656; C23C 14/0015; C23C 14/0036; C23C 14/0024; C23C 14/0611; C23C 14/0057; C23C 14/08; C23C 14/081; C23C 14/0635; C23C 14/0641; C23C 14/0644; C23C 14/0605; C25D 11/00; C25D 11/02; B32B 2307/536; B32B 2307/554
See application file for complete search history.

(56) References Cited

U.S. PATENT DOCUMENTS

| 4,214,952 A * | 7/1980 | Sato ............................. C25C 1/00 204/277 |
| 4,606,796 A * | 8/1986 | Hanazima .............. C25D 11/18 205/174 |
| 6,001,481 A * | 12/1999 | Dearnaley .............. C25D 11/18 428/312.2 |
| 6,447,891 B1 | 9/2002 | Veerasamy et al. |

(Continued)

FOREIGN PATENT DOCUMENTS

| CN | 1870863 A | 11/2006 |
| CN | 101275266 A | 10/2008 |

(Continued)

OTHER PUBLICATIONS

Ali Erdemir and Christophe Donnet; 2006 ; J. Phys. D: Appl. Phys. 39 Pgs. R311-R327 (Year: 2006).*

(Continued)

*Primary Examiner* — David Sample
*Assistant Examiner* — Elizabeth Collister
(74) *Attorney, Agent, or Firm* — Dorsey & Whitney LLP (57) ABSTRACT

Composite coatings having improved abrasion and dent resistance are described. According to some embodiments, the composite coatings include an outer hard layer and an intermediate layer between the outer hard layer and a metal substrate. The intermediate layer can have a hardness that is less than the hard outer layer but greater than the metal substrate. In this arrangement, the intermediate layer can act as a structural support that resists plastic deformation when an impact force is applied to the coating. In some embodi- (Continued)

ments, the intermediate layer is composed of a porous anodic oxide material. In some embodiments, the outer hard layer is composed of a ceramic material or a hard carbon-based material, such as diamond-like carbon.

19 Claims, 8 Drawing Sheets

(56) References Cited

U.S. PATENT DOCUMENTS

| | | | | |
|---|---|---|---|---|
| 8,133,579 | B2 | 3/2012 | Menning et al. | |
| 2001/0049018 | A1* | 12/2001 | Dearnaley | C25D 11/18 428/408 |
| 2006/0269704 | A1* | 11/2006 | Chen | C23C 8/80 428/34.4 |
| 2008/0274375 | A1* | 11/2008 | Ng | C25D 11/08 428/687 |
| 2010/0021695 | A1 | 1/2010 | Naoyuki et al. | |
| 2013/0319865 | A1* | 12/2013 | Browning | C25D 7/00 205/50 |
| 2014/0209467 | A1* | 7/2014 | Miao | C25D 11/14 205/50 |
| 2015/0068935 | A1* | 3/2015 | Kay | A45C 13/36 206/320 |
| 2016/0002792 | A1* | 1/2016 | Guimond | C23C 16/006 428/212 |
| 2017/0030204 | A1 | 2/2017 | Gorokhovsky | |
| 2017/0058407 | A1 | 3/2017 | Xu | |

FOREIGN PATENT DOCUMENTS

| | | | |
|---|---|---|---|
| CN | 101298690 | A | 11/2008 |
| CN | 104213173 | A * | 12/2014 |

OTHER PUBLICATIONS

Machine Translation: Wu, CN104213173 (A) [Translated :Aug. 20, 2018] (Year: 2014).*
Charitidis et al. ; Thin Solid Films; 2005; (482) pp. 120-125 (Year: 2005).*
Vetter, J.; 60 years of DLC coatings: Historical highlights and technical review of cathodic arc process to synthesize various DLC tyoes and their evolution for industrial applications, 2014, Surface & Coatings Technology, 257, pp. 213-240 (Year: 2014).*
Instron, Instron Vickers Test, accessed Sep. 12, 2019 [https://www.instron.us/our-company/library/test-types/hardness-test/vickers-test ], pp. 1-4 (Year: 2019).*
Mitutoyo, Micro Vickers Hardness Testing Machines, accessed Sep. 12, 2019 [https://www.mitutoyo.com/wp-content/uploads/2012/11/2055_HM-200.pdf] pp. 1-12 (Year: 2012).*
Chinese Application for Invention No. 201810194466.8—First Office Action dated Sep. 3, 2019.

* cited by examiner

ABRASION-RESISTANT SURFACE FINISHES ON METAL ENCLOSURES

FIELD

The described embodiments relate to abrasion-resistant coatings and methods for forming the same. The abrasion-resistant coatings can include a hard outer layer that resists abrasion, and an intermediate oxide layer that resists deformation upon impact and provides support for the hard outer layer.

BACKGROUND

Portable computing devices, such as mobile telephones, tablet computers, and laptop computers, come into contact with a wide range of hard and abrasive materials during normal use. Furthermore, the computing devices may be dropped and subject to impacts or abrasive wear from hard counter-materials. If the enclosures of the computing devices are not adequately protected, the enclosures can develop scratches, gouges and other defects that detract from the cosmetic appeal of the enclosures. If the enclosures include anodized metal portions, the scratches, gouges and defects may break through the protective anodic film and allow contaminants to corrode of the underlying metal. What are needed therefore are improved coatings for metallic surfaces.

SUMMARY

This paper describes various embodiments that relate to abrasion-resistant coatings useful for coating surfaces of consumer products, such as consumer electronic devices. In particular embodiments, the abrasion-resistant coatings include a porous oxide layer that provides structural support for an overlying hard layer formed of a highly abrasion-resistant material.

According to one embodiment, a housing for an electronic device is described. The housing includes a metal portion defining a cavity suitable for carrying internal electronic components. The housing also includes an abrasion-resistant coating disposed on a metal surface of the metal portion. The abrasion-resistant coating includes a hard layer characterized as having a first hardness. The abrasion-resistant coating also includes an intermediate layer grown from the metal portion and overlaid by the hard layer. The intermediate layer is composed of a porous oxide and is characterized as having a second hardness, wherein the first hardness is greater than the second hardness.

According to another embodiment, a part is described. The part includes a metal substrate and an abrasion-resistant coating disposed on the metal substrate. The abrasion-resistant coating includes an external layer composed of a diamond-like carbon material. The abrasion-resistant coating also includes an intermediate layer between the external layer and the metal substrate. The intermediate layer is composed of a porous oxide.

According to a further embodiment, a method of forming an abrasion-resistant coating on a housing for an electronic device is described. The housing has a metal portion defining a cavity suitable for carrying internal electronic components. The method includes converting a portion of the metal portion to a porous oxide layer. The method also includes depositing a hard layer on the porous oxide layer, wherein the hard layer is characterized as having a greater hardness than the porous oxide layer.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Coatings that provide improved resistance to abrasion and denting are described. The coatings can include a hard outer layer and an intermediate metal oxide layer. The hard outer layer can be composed of a non-metallic and non-polymer material, such as a carbide, a nitride, a diamond-like carbon (DLC), or a hard metal oxide. The intermediate metal oxide layer can be positioned between the hard layer and a metal substrate so as to provide structural support for the hard layer. The intermediate metal oxide layer can be sufficiently hard to minimize plastic deformation during impact, thereby making the coating more resistant to abrasion, denting or incurring other defects that can cosmetically and structurally compromise the coating.

Processes for forming the abrasion-resistant coating can include an anodizing process and a deposition process. The anodizing process can be used to convert a portion of a metal substrate to a corresponding porous oxide layer. The anodizing conditions can be chosen to form an oxide layer with a desired hardness, pore size and thickness. The deposition process can be used to deposit a thinner hard material onto the oxide porous oxide layer. The hard material can be composed of a ceramic (e.g., nitride, oxide or carbide material) or other hard material such as diamond-like carbon (DLC) and can be deposited using any suitable technique, such as a physical vapor deposition process.

The abrasion-resistant coatings can also be used to provide a cosmetic quality to a part. For example, in some cases, the abrasion-resistant coating has a high gloss finish. In some cases, the abrasion-resistant coating has a shiny black color and has a slick, cool-to-the touch feeling. Thus, the abrasion-resistant coatings are well suited for providing cosmetically appealing and protective surfaces to consumer products that may be exposed to a wide range of everyday materials such as steels and other metals, sand, stone, concrete, grit, glass, etc. For example, the abrasion-resistant coatings can be used to form durable and cosmetically appealing finishes for housing of computers, portable electronic devices, wearable electronic devices, and electronic device accessories, such as those manufactured by Apple Inc., based in Cupertino, Calif.

As described herein, the terms oxide, anodic oxide, metal oxide, etc. can be used interchangeably and can refer to suitable metal oxide materials, unless otherwise specified. Furthermore, the terms coating, layer, film, etc. can be used interchangeably and can refer to any suitable material that covers a surface of a substrate, part, etc. unless otherwise specified. For example, an oxide formed by anodizing an aluminum or aluminum alloy substrate can form a corresponding aluminum oxide film, layer or coating.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
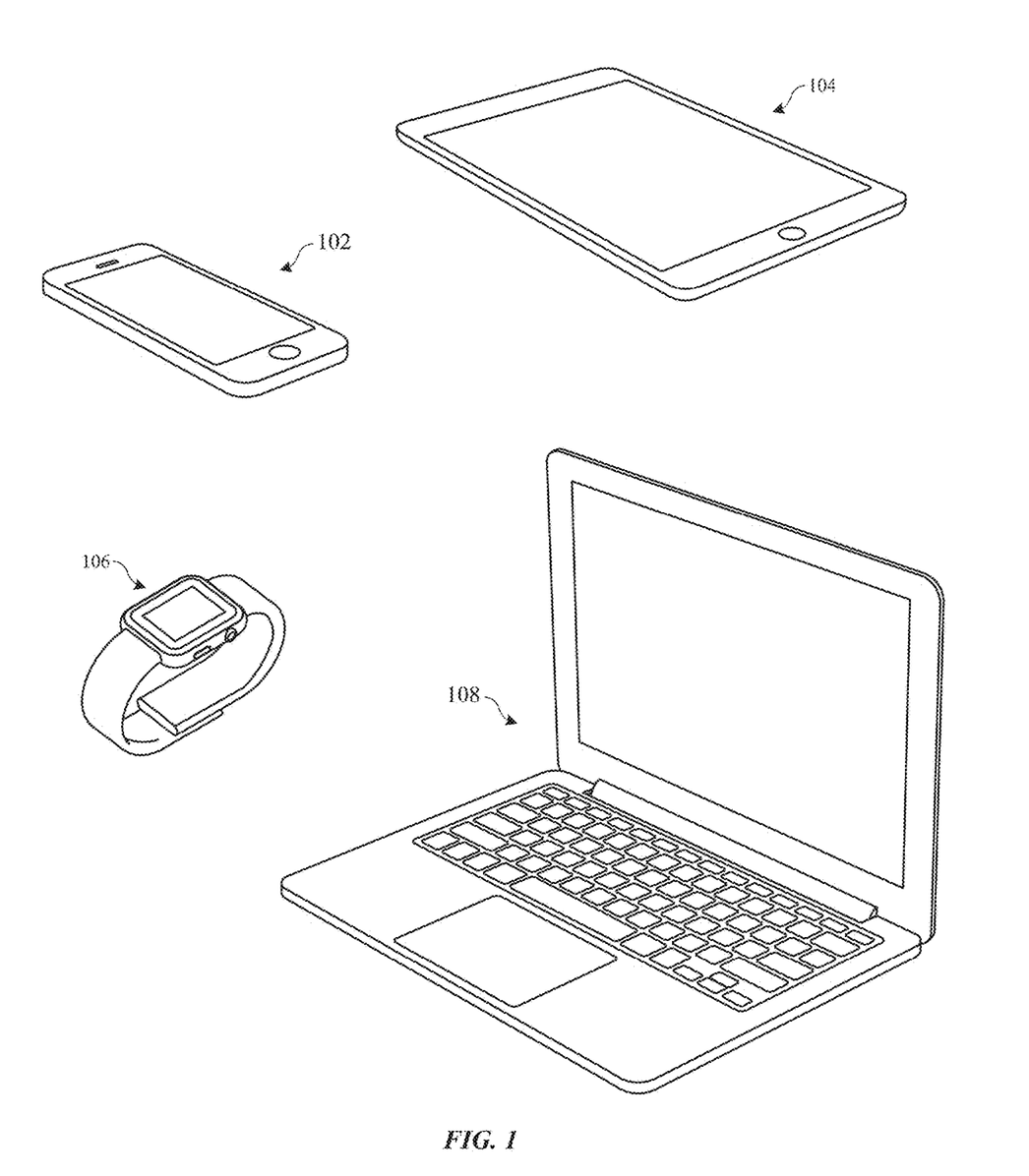
FIG. 1 shows perspective views of devices having metal surfaces that can be treated with the coatings described herein.

The methods described herein can be used to form durable and cosmetically appealing coatings for metallic surfaces of consumer products, such as consumer electronic devices shown in FIG. 1, which includes portable phone 102, tablet computer 104, smart watch 106 and portable computer 108. Electronic devices 102, 104, 106 and 108 can each include housings that are made of metal or have metal sections. Aluminum alloys and other anodizable metals and their alloys can be used due to their ability to anodize and form a protective anodic oxide coating that protects the metal surfaces from scratches. Aluminum alloys, such as 5000 series, 6000 series or 7000 series aluminum alloys, may be choice metal materials due to their light weight and durability.

Figure 2:
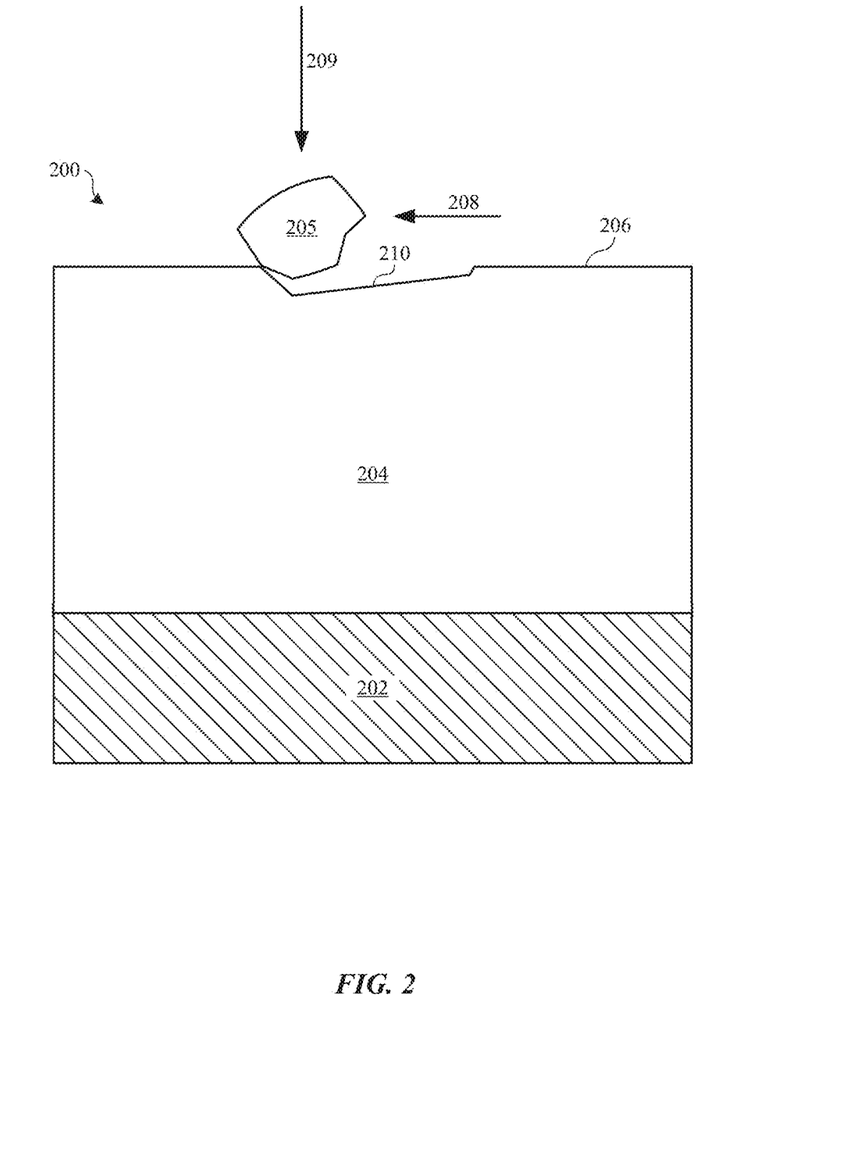
FIG. 2 illustrates a cross-section view of a part having an anodic oxide coating.

Anodizing, in general, is an electrolytic process whereby a portion of a metal substrate is converted to an anodic oxide film, which can provide corrosion protection to the metal substrate and can also provide a cosmetically appealing finish to the metal substrate. For example, some aluminum alloys can be anodized in accordance with a "Type II anodizing" process, as defined by military specification MIL-A-8625 standards, to provide durable and porous aluminum oxide ($Al_2O_3$) coatings. To illustrate, FIG. 2 shows a cross-section view of a portion of part 200.

Part 200 includes metal substrate 202 and oxide coating 204 formed using, for example, a Type II anodizing process. Oxide coating 204 has a porous microstructure that can be infused with colorants such as dye, pigment, metal or a combination thereof, to produce any of a multitude of colors. Darker colors, such as various shades of black and brown, can be achieved by electro-depositing metal within the porous structure. After the coloring process, the pores (not shown) within anodic oxide coating 204 are typically sealed to sealing using, for example, hydrothermal hydration. In some cases, oxide coating 204 is then be lapped (e.g., polished and/or buffed) to a cosmetically attractive high gloss. The thickness of oxide coating 204 can vary depending on application requirements. In some applications, oxide coating 204 has a thickness between about 10 and 30 micrometers.

Oxide coating 204 is generally harder than underlying substrate 202. For example, a Type II oxide coating 204 can have a Vickers hardness ranging between about 300 and 500 $HV_{0.05}$. Thus, oxide coating 204 can offer significant resistance to impact loads that might otherwise plastically deform a relatively softer underlying aluminum alloy substrate 202. However, oxide coating 204 can still be susceptible to scratching. For example, hard particle 205, which can be composed of metal, sand, stone, concrete, grit, glass or other hard material that part 200 may encounter during normal use, can contact and slide across outer surface 206 (as represented by arrow 208) and abrade away some of oxide coating 204. Even at relatively light applied pressure 209, outer surface 206 can develop a visible scratch 210, which can detract from the cosmetics of part 200. Moreover, if oxide coating 204 is colorized a dark color (e.g., black) and has outer surface 206 that is lapped to a high gloss, it can lack the optical depth to hide such scratch 210, thereby making scratch 210 especially conspicuous. That is, a high gloss outer surface 206 on a polished dark-colored oxide coating 204 can highlight even a very small surface scratch 210 or other defects, which can appear as white or silver colored spots.

Figure 3A:
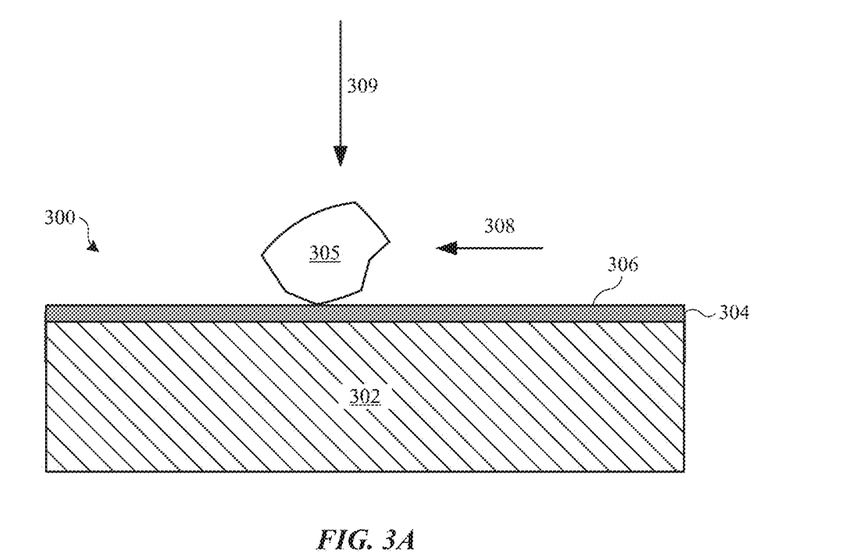
FIGS. 3A and 3B illustrate cross-section views of a part having a diamond-like carbon coating.
Figure 3B:
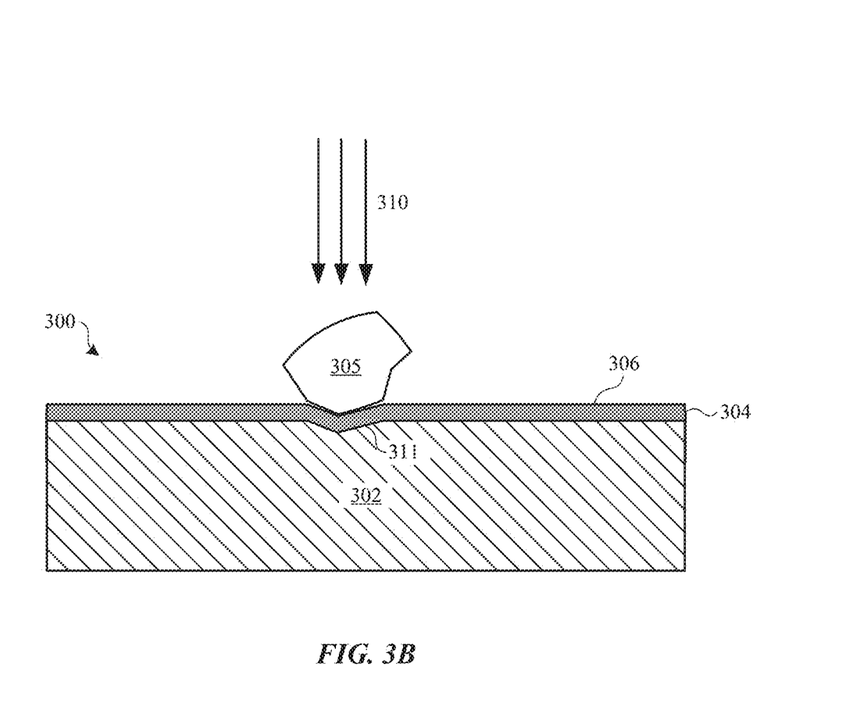

An alternative coating for metal substrates includes diamond-like carbon (DLC) coatings, which are generally harder than conventional anodic oxide coatings. FIGS. 3A and 3B show a cross-section view of a portion of part 300, which includes metal substrate 302 and DLC coating 304. In general, DLC is an amorphous carbon material, which can exist in several forms based on their different mixtures of carbon crystal lattice structures. DLC coating 304 can offer a surface finish with extremely high abrasion resistance due to its high hardness, which can be equivalent to or even greater than that of natural diamond (i.e., 10,000 HV as measured using Vickers hardness test). For example, DLC coating 304 may resist scratching when hard particle 305 applied with light applied pressure 309 slides across outer surface 306, as represented by arrow 308 in FIG. 3A.

However, DLC coating 304 may not provide good wear protection when applied on a relatively soft metal substrate 302, such as an aluminum or aluminum alloy substrate (as opposed to, for example, stainless steel). For example, some aluminum alloys have a yield strength ranging between about 300 to about 400 MPa, and a hardness values ranging between about 100 to about 150 $HV_{0.05}$. The relatively soft metal substrate 302 can plastically deform beneath DLC coating 304 when a larger pressure 310 is applied. Even moderate surface impact loads may deform an aluminum alloy substrate 302, even through a relatively thick DLC coating 304 (e.g., having a thickness of about 2.5 micrometers). In some cases, high interfacial shear and/or tensile stresses can result, and can cause DLC coating 304 to locally detach from metal substrate 302. This manifests itself as bright spots of metallic color, which can be very obvious visual defect against a dark DLC coating 304, even if the defect is very small. Even if DLC coating 304 does not locally detach from metal substrate 302, plastic deformation of metal substrate 302 can result in discontinuities in outer surface 306 (e.g., dent 311), which stand out against a general smooth mirror-like finish of outer surface 306.

Figure 4A:
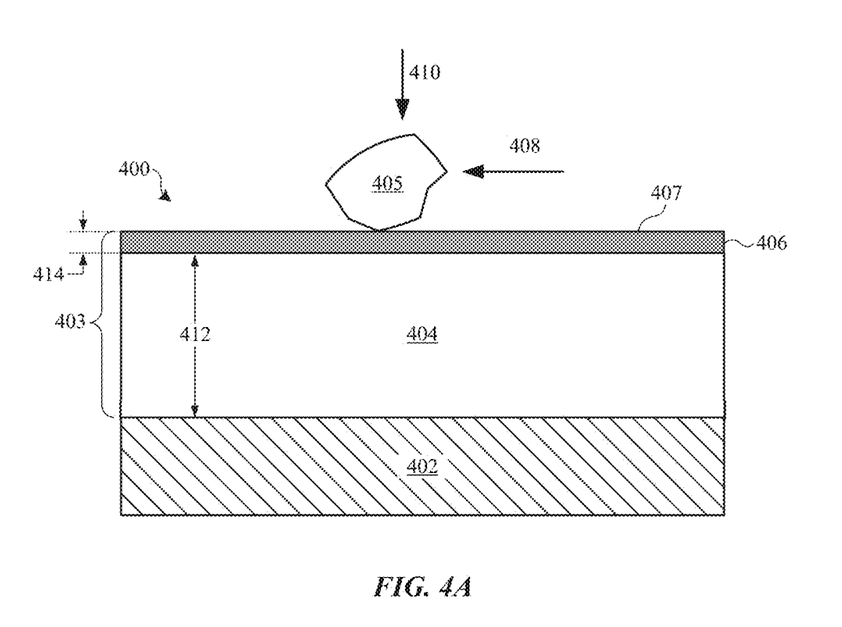
FIGS. 4A and 4B show cross-section views of a part that includes an abrasion-resistant coating.
Figure 4B:
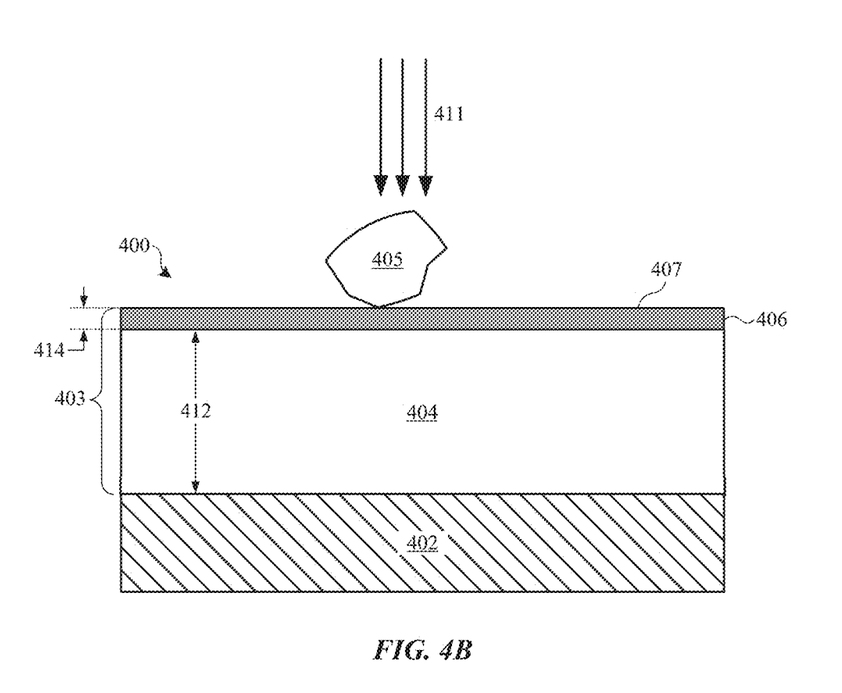

The abrasion-resistance coatings described herein are designed to address the problems associated with coating a relatively soft metal substrate. FIGS. 4A and 4B show cross-section views of part 400, which includes metal substrate 402 having abrasion-resistant coating 403, in accordance with some embodiments. Abrasion-resistance coating 404 includes intermediate layer 404 and hard layer 406, which may also be referred to as intermediate portion 404 and hard portion 406 respectively. Intermediate layer 404 is composed of a metal oxide material, such as an aluminum oxide material. Hard layer 406 is composed of any suitable material that is harder than each of intermediate layer 404 and metal substrate 402. In some embodiments, hard layer 406 is composed of a non-metallic and non-polymer material. In some embodiments, hard layer 406 is composed of one or more of a carbide, a nitride, a diamond-like carbon, and a hard oxide. Thus, abrasion-resistant coating 403 can be referred to as a composite coating (i.e., having different portions composed of different materials). Suitable carbide materials can include, but are not limited to, tungsten carbides, titanium carbides, and silicon carbides. Suitable nitride materials can include, but are not limited to, titanium nitrides, silicon nitrides, chromium nitrides, zirconium nitrides, zirconium carbon nitrides, and titanium aluminum nitrides. Suitable DLC materials can include suitable amorphous and partially amorphous forms of diamond-like carbon (e.g., tetrahedral amorphous carbon (ta-C)). Suitable hard oxide materials can include, but are not limited to, non-porous aluminum oxides and titanium oxides.

In addition to having layers of different compositions, abrasion-resistant coating 403 also differs from conventional coatings in its physical properties. For example, in some embodiments, hard layer 406 composed of DLC is characterized as having a Vickers hardness value ranging between about 1000 and about 1500 $HV_{0.5}$, and intermediate layer 404 can be characterized as having a Vickers hardness value ranging between about 400 and about 600 $HV_{0.5}$. Thus, outer surface 407 can retain a very high hardness (e.g., between about 1000 and about 1500 $HV_{0.5}$) while underlying intermediate layer 404 can have a hardness between that of hard layer 406 and metal substrate 402 (e.g., between about 400 and about 600 $HV_{0.5}$). This arrangement provides a coating 403 with improved abrasion and deformation resistance over conventional coatings.

These aspects are illustrated in FIGS. 4A and 4B. FIG. 4A shows that when hard particle 405 is applied with light force 410, it slides across outer surface 407 (represented by arrow 408). In this way, hard layer 406 provides resistance to surface abrasion. FIG. 4B shows that when hard particle 405 is applied to outer surface 407 with large applied force 411, intermediate layer 404 provides mechanical support beneath hard layer 406 that can resist plastic deformation, thereby preventing indentation within hard layer 406, and preventing or reducing the occurrence of visible defects on part 400. That is, intermediate layer 404 is harder than metal substrate 402, and therefore less likely to deform under large applied force 411. In this way, intermediate layer 404 acts as a structurally supportive layer to hard layer 406.

Thickness 412 of intermediate layer 404 and thickness 414 of hard layer 406 can vary depending on application requirements. In general, hard layer 406 should be thick enough to provide suitable abrasion resistance under normal use of part 400. However, thicker hard films may take prohibitively long times to apply in production environments. In some embodiments, thickness 414 of hard layer 406 ranges between about 0.5 micrometer and 3 micrometers. Intermediate layer 404 should be thick enough to provide suitable structural support for hard layer 406 to eliminate or adequately reduce the occurrence of denting within hard layer 406. However, having too thick of an intermediate layer 404 may not provide significant additional structural support. In some embodiments, thickness 412 of intermediate layer 404 is at least about 8 micrometers. In some embodiments, thickness 412 of intermediate layer 404 ranges between about 8 and about 30 micrometers.

This arrangement with hard layer 406 corresponding to the outermost layer of abrasion-resistant coating 403 can also provide cosmetic advantages. Hard coatings such as carbides, nitrides and DLC can be applied as very thin films that closely conform to a substrate surface. Thus, hard layer 406 can be applied to a smooth surface to form a correspondingly smooth outer surface 407. Likewise, a hard layer 406 can be applied to a textured surface to form a correspondingly textured outer surface 407. A DLC hard layer 406, in particular, can be applied to a smooth surface with a very high gloss to give a visually appealing black mirror-like finish. Furthermore, DLC generally has a vey low coefficient of friction. Hence, hard layer 406 composed of DLC can have an outer surface 407 having a slick feel, which can be tactilely desirable. Moreover, DLC material generally has a relatively high thermal conductivity, rapidly dissipating heat and hence giving outer surface 407 a cool to the touch feeling, much like a metal surface. In these ways, abrasion-resistant coating 403 can provide a better look and feel to part 400 compared to, for example, a polymer-based coating.

FIGS. 5A-5D show cross-section views of part 500 undergoing a process for forming an abrasion-resistant coating, in accordance with some embodiments. At FIG. 5A, surface 501 of metal substrate 502 is optionally treated to have pre-determined surface finish. In some embodiments, surface 501 is polished to a mirror shine using one or more lapping, buffing, chemical or electrochemical polishing operations. In other embodiments, surface 501 is polished to form a planar surface, then texturized using one or more chemical etching and abrasive blasting operations.

Figure 5A:
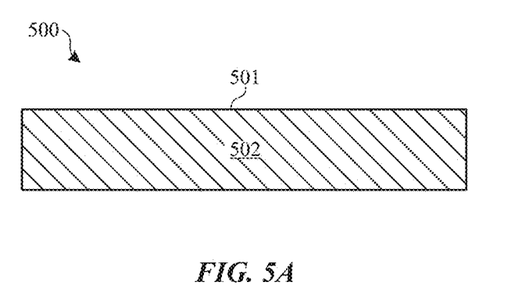
FIGS. 5A-5D show cross-section views of portions of a part undergoing a process for applying an abrasion-resistant coating.

Metal substrate 502 can be composed of any suitable anodizable metal, including aluminum and/or titanium. In some embodiments, metal substrate 502 is composed of an aluminum alloy, such as a 6000-series aluminum alloy (per The International Alloy Designation System). In some embodiments, metal substrate 502 is composed of an aluminum alloy containing relatively high levels of zinc as an alloying element, which can increase the strength and hardness of the aluminum alloy. For example, some 7000-series aluminum alloys, which are known for their high strength, can have relatively high levels of zinc. In some applications, the target yield strength for metal substrate 502 is at least about 330 MPa. In some cases, this corresponds to an aluminum alloy having a zinc concentration of at least about 4 weight %. In other cases, this corresponds to an aluminum alloy having a zinc concentration of at least about 2 weight %. It is believed that zinc combines with magnesium as another alloying element to form precipitates such as $MgZn_2$ (the η' or "eta-prime" phase), which gives the aluminum alloy its high strength. Thus, the aluminum alloys having relatively high levels of zinc may also have relatively high levels of magnesium. In some embodiments, metal substrate 502 is composed of an aluminum alloy having a magnesium concentration of at least about 2 weight %. In some embodiments, metal substrate 502 is composed of an aluminum alloy having a magnesium concentration of at least about 1 weight %.

Figure 5B:
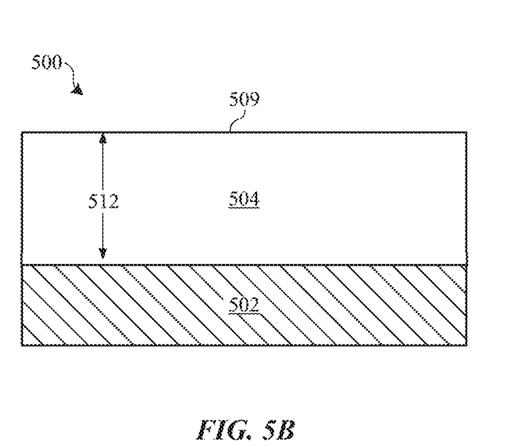

At FIG. 5B, shows metal substrate 502 after undergoing an anodizing process, whereby a portion of metal substrate 502 is converted to intermediate layer 504. Intermediate layer 504 is composed of an oxide of the metal material of metal substrate 502. For example, portions of metal substrate 502 composed of an aluminum alloy can be converted to intermediate layer 504 composed of an aluminum oxide (i.e., $Al_2O_3$) material. Oxide coating 504 can be grown to any suitable thickness 512. As described above, thickness 512 should be sufficiently high to reasonably withstand plastic deformation under relatively large applied forces incurred during normal use of part 500, which can be at least about 8 micrometers in some applications. In some embodiments, intermediate layer 504 is a porous anodic oxide, in that elongated pores (not shown) having diameters on the scale of tens of nanometers are formed within intermediate layer 504 during the anodizing process. For example, in some embodiments, a Type II anodizing process (sulfuric acid anodizing) is used to form intermediate layer 504 having a porosity of ranging between about 20% and about 30%, and having pores with diameters ranging between about 10 and about 30 nanometers. In some embodiments, intermediate layer 504 has a hardness ranging between about 300 and about 500 $HV_{0.05}$, with a thickness ranging between about 10 and about 30 micrometers.

Figure 5C:
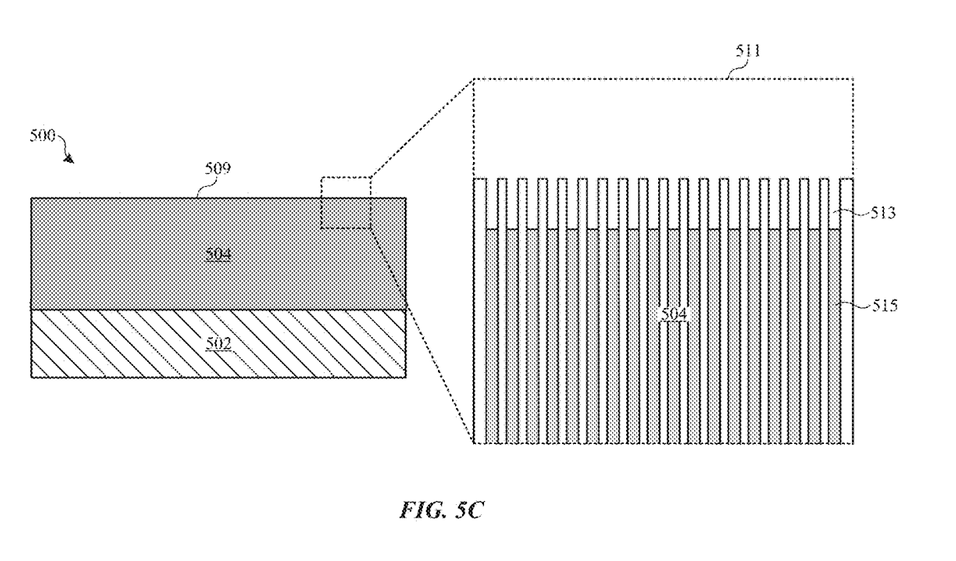

At FIG. 5C, an optional coloring process can be performed to impart a color to intermediate layer 504. As shown in inset view 511, this can be accomplished by infusing colorant 515 within pores 513 of intermediate layer 504. The type of colorant 515, and whether to perform a coloring process, will depend on a desired color quality of the final abrasion-resistant coating. In a particular embodiment, intermediate layer 504 may be immersed in metallo-organic aqueous dyes, or by electro-coloring (e.g., deposition of tin, nickel, copper, cobalt or combinations thereof into pores 513) to impart a black color to intermediate layer 504. Black pigments, such as cobalt sulfide, may also be formed by reaction of two compounds in successive immersions. Dark or black coloration 515 of intermediate layer 504 is particularly advantageous where a dark or black hard layer 506 such as DLC is subsequently applied, because it provides a much greater physical depth of color in the coating system, so that even when the coating is subject to severe damage which fully penetrates hard layer 506, this does not expose substrate 502 which would result in a high-contrast silver or metallic cosmetic defect. Similarly, where gold or rose-gold hard layers are applied, the colorant 515 of layer 504 can be tuned to match and help conceal severe damage to the subsequently applied hard outer layer. It should be noted that in some embodiments intermediate layer 504 is not colorized.

If intermediate layer 504 is grown on metal substrate 502 that was previously finished to a very smooth and glossy state, surface 509 of intermediate layer 504 can also be smooth and present a high gloss, although there may be some degree of roughness and reduction in gloss and clarity due to the anodizing process itself. Thus, in some embodiments, a lapping process is implemented to polish surface 509 of intermediate layer 504 to a high gloss. This can assure that an outer surface of a subsequently deposited hard layer has a mirror-like finish, in those applications where such a finish is desirable. The lapping process can involve any suitable lapping, polishing or buffing operation, or any suitable combination thereof. In some embodiments, the lapping process includes contacting surface 509 with a slurry containing silica or diamond particles. According to some applications, the lapping process is performed after the coloring process (if used) to obtain a consistent color to intermediate layer 504. However, in other embodiments the lapping process may be performed prior to the coloring process.

Figure 5D:
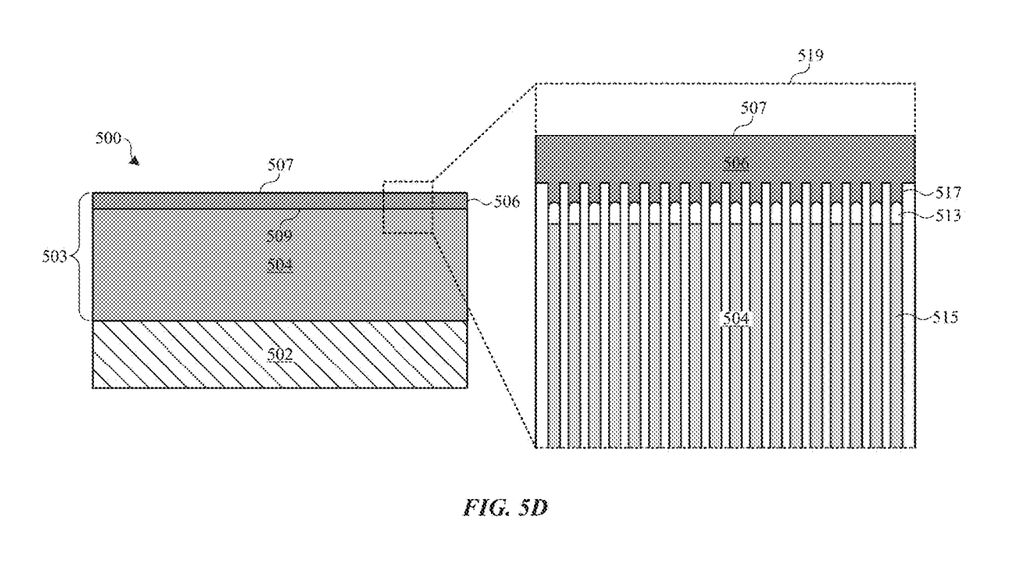

FIG. 5D shows part 500 after hard layer 506 is deposited on surface 509 of intermediate layer 504. Any suitable deposition process can be used to deposit hard layer 506. In some embodiments, a physical vapor deposition (PVD) process is used. However, other suitable deposition techniques can be used, such as suitable chemical vapor deposition (CVD) processes.

In accordance with some embodiments, pores 513 of intermediate layer 504 are not sealed prior to depositing hard layer 506 so that some of the material of hard layer 506 can flow within top portions 517 of pores 513, as shown in inset view 519. A sealing process generally involves exposing a porous anodic film to a hot aqueous solution such that the oxide material surrounding the pores is hydrated, effectively closing the pores and prevents staining of the anodic film by uptake of dirt or other material during further processing and in-service use, and also increases the corrosion resistant properties of the anodic film. Such sealing operation is normally done right after an anodizing process for consumer product applications.

By not sealing intermediate layer 504, pores 513 are open and able to accept some of the deposited hard layer 506. For example, it has been found that hard layer 506 can bridge pores 513 having diameters of approximately 30 nanometers at the outer extremities of pores 513. In some cases, hard layer 506 penetrates the outermost 50 nanometers of pores 513. This fine-scale roughness and relatively high surface area of unsealed surface 509 (as compared to a non-porous surface or sealed surface) may offer a degree of mechanical keying that aids the adhesion of hard layer 506. This allows hard layer 506 to bond with more surface area of intermediate layer 504, thereby providing better adhesion of hard layer 506 to intermediate layer 504 and preventing subsequent delamination or spalling of hard layer 506 from intermediate layer 504.

Furthermore, the mechanical properties of an unsealed intermediate layer 504 (i.e., thermal expansion coefficient and stiffness) offer a better match to the material of hard layer 506 than a sealed oxide. This can be important since some deposition processes for depositing hard layer 506 involve exposing part 500 to high temperatures that can crack a sealed intermediate layer 504. For example, some PVD deposition processes for depositing DLC material involve exposure to temperatures between about 200 and about 300 degrees Celsius. If pores 513 are sealed, intermediate layer 504 is more rigid and less capable of withstanding such high temperatures without cracking. By leaving intermediate layer 504 unsealed, intermediate layer 504 is less likely to crack during such a thermal deposition process. Even if hard layer 406 is deposited using a lower temperature process, the difference between the thermal expansion coefficients of metal substrate 502 and intermediate layer 504 could result in cracking of intermediate layer 504. That is, the open pores 513 can provide greater mechanical compliance to intermediate layer 504 compared to a stiffer, sealed oxide layer, thereby minimizing the stresses induced by thermal cycles and avoiding the cracking of intermediate layer 504. Surprisingly, this can be equally true of a lapped unsealed intermediate layer 504—i.e., there is little or no blocking of pores 513 from the lapping.

It should be noted that in alternative embodiments a light sealing process (or a superficial seal) is implemented prior to lapping of intermediate layer 504, which can involve exposing intermediate layer 504 to a hot aqueous solution for limited and very small amount of time (e.g., 60 seconds or less). Alternatively or additionally, intermediate layer 504 can be exposed to a silicate surface seal prior to lapping. In either case, pores 513 may only be partially sealed so that intermediate layer 504 can be more resistant to staining and handling damage whilst retaining its mechanical compliance (i.e., low elastic modulus).

Hard layer 506 boosts the abrasion resistance of coating system 503 due to its greatly elevated surface hardness, so that light surface scratches from materials with hardnesses comparable to intermediate layer 504 are eliminated, whilst the strength and hardness of the relatively thick intermediate layer 504 increases the loads required for any plastic deformation of surface 507. In this way, the composite abrasion-resistant coating 503 is far superior in resistance to substrate deformation and denting or scratching at higher loads than, for example, a DLC coating applied directly to aluminum or aluminum alloy substrate.

The same can be true of any other color of coating 503, such as a gold or rose-gold PVD coating, since the color of intermediate layer 504 can be very precisely color-matched using organic dyes. Furthermore, in some cases, the additional depth of color provided by a colorized intermediate layer 504 can reduce the thickness and color-tuning requirements of hard layer 506, as compared to the thickness and color-tuning requirements for achieving the same cosmetic finish using a stand-alone hard layer applied directly to a metallic substrate. Thus, thinner hard coating layers can potentially be used, and a wider range of colors can be achieved than might be achievable by tuning a PVD coating system alone.

According to some embodiments, the final abrasion-resistant coating 503 comprises intermediate layer 504 having a thickness ranging between about 8 to about 30 micrometers capped with hard layer 506 having a thickness ranging between about 0.5 and 3 micrometers, corresponding to a final thickness of abrasion-resistant coating 503 having a thickness ranging between about 7.5 and about 33 micrometers. In some embodiments, the final hardness of abrasion-resistant coating 503 closely corresponds to the hardness of hard layer 506, i.e., between about 1000 and about 1500 $HV_{0.5}$.

In some embodiments, intermediate layer 504 is an anodic oxide material having a hardness approaching 500 $HV_{0.5}$. Thus, a thinner hard layer 506 can be used than might be used, for instance, on a stainless steel substrate (e.g., having a hardness of about 250 $HV_{0.5}$). For example, where a DLC coating having a thickness of between about 2 and about 3 micrometers might be necessary to provide for abrasion protection of on stainless steel, abrasion-resistant coating 503 with hard layer 506 having a thickness of about one micrometer may be found to offer similar performance on an aluminum or aluminum alloy metal substrate 502. In fact, the corrosion protection offered by abrasion-resistant coating 503 can be comparable to that of a well-sealed anodic coating.

Since abrasion-resistant coating 503 has improved abrasion and denting resistance, the likelihood that an impact event will cause a breakage within abrasion-resistant coating 503 that exposes metal substrate 502 to an external environment is decreased. This aspect can be important if, for example, metal substrate 502 is composed of a metal that is more prone to corrosion when exposed to water or other corrosion-inducing agents. For example, some high strength aluminum alloys, such as some 7000-series alloys and other aluminum alloys having higher concentrations of zinc (as described above), can be more susceptible to corrosion than other aluminum alloys having lesser concentrations of zinc. Thus, abrasion-resistant coating 503 can be especially useful for coating such alloys.

In some embodiments, intermediate layer 504 is colored a black color that closely corresponds to a black color of hard layer 506 (e.g., a black DLC layer). As described above, this can be accomplished by infusing colorant within pores of intermediate layer 504. In this way, the black color of intermediate layer 504 will be visible rather than a bright metallic color of metal substrate 502 if a portion of hard layer 506 detaches from intermediate layer 504 (e.g., by way of denting or scratching), thereby making such defects within hard layer 506 less apparent to a user. The same can be true of other color of hard-coating such as a gold or rose-gold PVD coating, since the color of intermediate layer 504 can be very precisely color-matched using organic dyes. Furthermore, in some cases, the additional depth of color provided by a colorized intermediate layer 504 can reduce the thickness and color-tuning requirements of hard layer 506, as compared to the thickness and color-tuning requirements for achieving the same cosmetic finish using a stand-alone hard layer applied directly to a metallic substrate. Thus, thinner hard coating layers can potentially be used, and a wider range of colors can be achieved than might be achievable by tuning a PVD coating system alone.

Since surface 507 of hard layer 504 can correspond to an outer surface of part 500, a user may have tactile access to surface 507. If hard layer 504 is composed of a ceramic or hard carbon-based material (e.g., DLC), surface 507 may have a similar feel as a metallic surface, as described above. For example, surface 507 can have a cool-to-the touch feeling, or may have a warm feeling if surface 507 is proximate to a warm entity (e.g., a working electronic component within an electronic device). In this way, abrasion-resistant coating 503 can provide a different user experience than, for example, a polymer-based coating.

Figure 6:
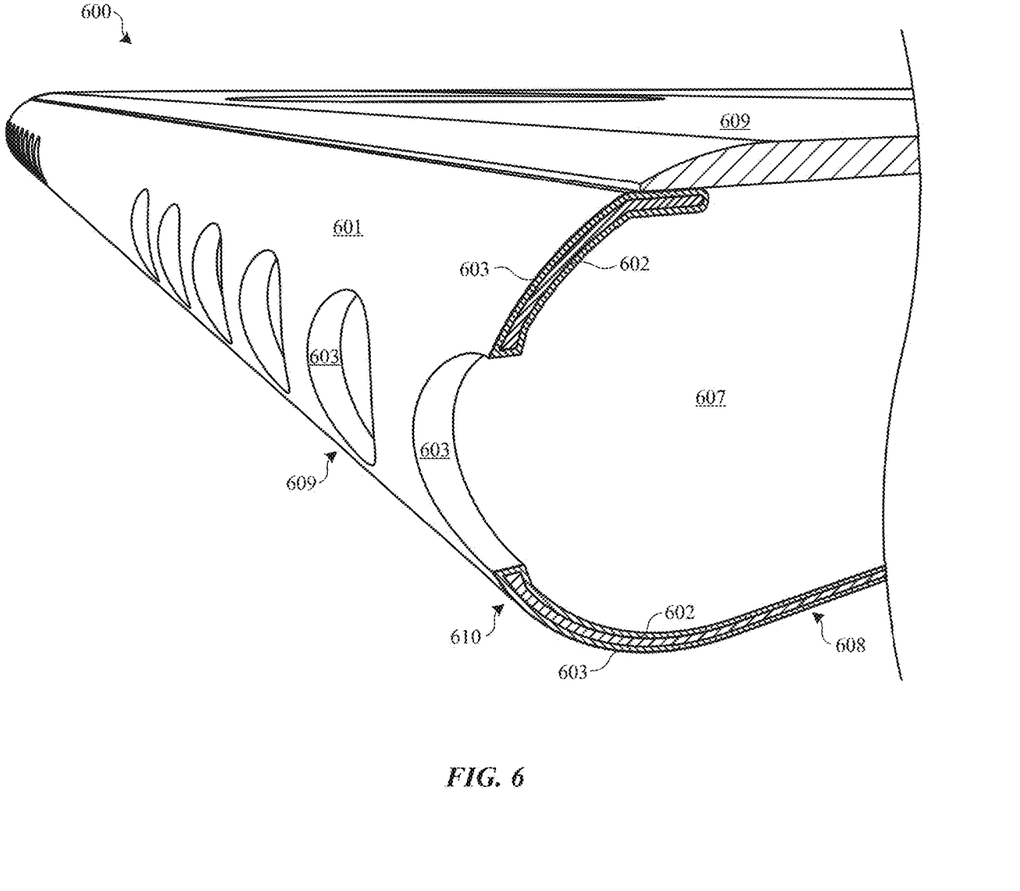
FIG. 6 shows an isometric cross-section view of a portion of a housing with an abrasion-resistant coating.

FIG. 6 shows an isometric cross-section view of a portion of a housing 600 (also referred to as an enclosure) for an electronic device, such as a smart phone or other mobile device. Housing 600 includes metal portion 601, which can have a shape and a size that define cavity 607, which is suitable for carrying internal electronic components (e.g., an integrated circuit, a display assembly, a speaker, etc.) (not shown). Non-metal portion 609 can cooperate with metal portion 601 to fully enclose the internal electronic components. In some embodiments, non-metal portion 609 corresponds to a visually transparent cover that provides visual access to a display assembly (not shown). In some cases, the display assembly is a touch sensitive assembly.

Metal portion 601 includes metal substrate 602 coated with abrasion-resistant coating 603, which corresponds to a composite coating that includes an intermediate porous oxide layer and an outer hard layer, such as abrasion-resistant coating 403 or 503, described above. Abrasion-resistant coating 603 can substantially cover all metal surfaces of metal substrate 602 which would be visible to a user when the electronic device is fully assembled—i.e., exterior surfaces of metal portion 601. In some cases, abrasion-resistant coating 603 covers at least some of the interior surfaces of metal portion 601—i.e., surfaces exposed within cavity 607. However, some interior surfaces of metal portion 601 within cavity 607 may not have abrasion-resistant coating 603.

Metal portion 601 can include a substantially planar (i.e., flat) back 608, curved sides 610 and openings 609 (e.g., speaker holes). Abrasion-resistant coating 603 can continuously cover surfaces of back 608, curved sides 610 and surfaces that define openings 609 to form a smooth, uninterrupted and cosmetically appealing protective coating to housing 600. Abrasion-resistant coating 603 has an outer hard layer that provides superior scratch resistance, and an intermediate layer that provides structural support for the hard layer, thereby making the abrasion-resistant coating 603 resistant to denting.

It should be noted that applications for the abrasion-resistant coatings described herein are not limited to enclosures, but can be used to coat any suitable device or part. For example, the coatings can be used to coat buttons (e.g., power or volume buttons of an electronic device), clasps and clips (e.g., for a watch), bands (e.g., watch bands or bracelets), jewelry, clothing accessories, etc.

Figure 7:
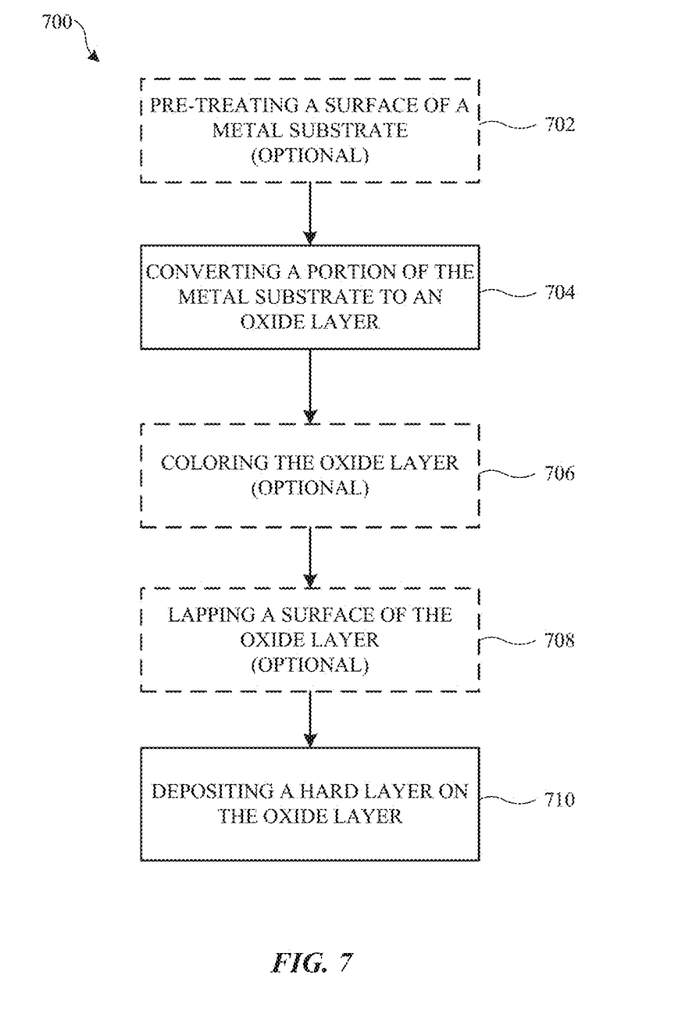
FIG. 7 shows a flowchart indicating a process for forming an abrasion-resistant coating.

FIG. 7 shows flowchart 700, which illustrates a process for forming an abrasion-resistant coating, in accordance with some embodiments. At 702 a surface of a metal substrate is optionally treated prior to an anodizing process. The pre-treatment can include one or more surface finishing operations, such as lapping (polishing), buffing, chemical polishing, chemical etching, and abrasive blasting. In some embodiments, a lapping process and/or chemical polishing process is used to form a mirror-finish on the surface of the metal substrate.

At 704, a portion of the metal substrate is converted to an oxide layer composed of a corresponding metal oxide material. In some embodiments, the metal substrate is an aluminum alloy and the oxide layer is composed of aluminum oxide. In some embodiments, a Type II anodizing process is used to form a porous oxide layer having pores with diameters ranging between about 10 and about 30 nanometers. The oxide layer can be grown to any suitable thickness. In some embodiments, the oxide layer is grown to a thickness ranging between about 8 to about 30 micrometers.

At 706, the oxide layer is optionally colored, such as by infusing a colorant within pores of the oxide layer. Any suitable colorant can be used, including one or more suitable dyes, pigments or metals. In some embodiments, one or more metals (e.g., tin, nickel, copper, cobalt) are electrodeposited within the pores to attain a black color to the oxide layer. At 708, a surface of the oxide layer is optionally lapped to a high gloss.

At 710, a hard layer is deposited on the oxide layer. The hard layer is composed of a material that has a greater hardness than the oxide layer. In some embodiments, the hard layer is composed of a non-metallic and non-polymer material. In some embodiments, the hard layer is composed of a hard ceramic material. In some embodiments, the hard layer is composed of one or more of a carbide, a nitride, a diamond-like carbon, and a hard oxide. In a particular embodiment, the hard layer is composed of a DLC material.

The hard layer can be deposited to any suitable thickness. In some cases, the hard layer is significantly thinner than the oxide layer. In some embodiments, the hard layer is deposited to a thickness ranging between about 0.5 micrometers and about 3 micrometers. The thinner hard layer provides an outer hard surface that is resistant to scratching. The thicker oxide layer acts as a support that can prevent or reduce the occurrence of denting if the thinner hard layer. In embodiments where the oxide layer is colored, the oxide layer can also act as a color barrier such that if the hard layer does become scratched or dented, the colored oxide layer is visible rather than a bright metallic color of the underlying metal substrate. For example, a black-colored oxide layer can underlie a black DLC layer.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A housing for an electronic device, the housing comprising:
    a metal portion; and
    an abrasion-resistant coating overlaying the metal portion, the abrasion-resistant coating comprising:
        a lapped metal oxide layer that defines a pore;
        an organic colorant deposited within the pore by aqueous immersion of the metal oxide layer; and
        a layer that overlaps the lapped metal oxide layer, the layer comprising a material comprising at least one of a carbide, a nitride, or a diamond-like carbon that is disposed within and seals the pore and overlays the organic colorant, the layer having a thickness between 0.5 micrometers to 3 micrometers.

2. The housing of claim 1, wherein the metal oxide layer has a thickness between 8 micrometers to 30 micrometers.

3. The housing of claim 1, wherein the pore is defined by a pore wall, and the material is bonded to an internal surface of the pore wall.

4. The housing of claim 1, wherein the material comprises a diamond-like carbon.

5. The housing of claim 4, wherein the metal oxide layer has a Vickers hardness ranging between 400 HV0.5 to 600 HV0.5.

6. The housing of claim 1, wherein the layer has a polished exterior surface.

7. The housing of claim 1, wherein a color of the organic colorant is matched to a color of the layer.

8. The housing of claim 1, wherein the layer penetrates an upper portion of the metal oxide layer to a depth of at least 50 nanometers.

9. The housing of claim 1, wherein the layer has a greater hardness than the metal oxide layer.

10. The housing of claim 1, wherein the abrasion-resistant coating has a hardness between 1000 HV0.5 to 1500 HV0.5.

11. The housing of claim 1, wherein the metal portion comprises aluminum.

12. A part for a portable electronic device, the part comprising:
    a metal substrate; and
    an abrasion-resistant coating disposed on the metal substrate, the abrasion-resistant coating comprising:
        a lapped intermediate metal oxide layer that overlays the metal substrate, the lapped intermediate metal oxide layer defining a pore, the lapped intermediate metal oxide layer having a thickness between 8 micrometers to 14 micrometers;
        an organic colorant deposited within the pore by aqueous immersion of the metal oxide layer; and
        an external layer that overlaps the lapped intermediate metal oxide layer, the external layer comprising a material comprising at least one of a carbide, a nitride, or a diamond-like carbon that is disposed within and seals the pore and overlays the organic colorant.

13. The part of claim 12, wherein the external layer has a thickness between 0.5 micrometers to 3 micrometers.

14. The part of claim 12, wherein the material comprises a diamond-like carbon.

15. The part of claim 12, wherein the abrasion-resistant coating has a hardness between 1000 HV0.5 to 1500 HV0.5.

16. A method of forming an abrasion-resistant coating over a metal portion, the abrasion-resistant coating comprising a metal oxide layer and a layer, the method comprising:
    converting a portion of the metal portion to the metal oxide layer, the metal oxide layer having a thickness between 8 micrometers to 14 micrometers, wherein the metal oxide layer defines a pore;

infusing an organic colorant into the pore by an aqueous immersion process;

lapping the metal oxide layer; and depositing the layer over the lapped metal oxide layer, wherein the layer comprises a material comprising at least one of a carbide, a nitride, or a diamond-like carbon that is disposed within and seals the pore, and overlays the organic colorant.

17. The method of claim 16, wherein the layer has a thickness between 0.5 micrometers to 3 micrometers.

18. The method of claim 16, wherein the material comprises a diamond-like carbon.

19. The method of claim 16, wherein the abrasion-resistant coating has a hardness between 1000 HV0.5 to 1500 HV0.5.

* * * * *